(12) United States Patent
Santo

(10) Patent No.: US 7,888,836 B2
(45) Date of Patent: Feb. 15, 2011

(54) DC MOTOR WITH IMPROVED WIRING CONNECTIONS

(75) Inventor: Shinji Santo, Kosai (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 284 days.

(21) Appl. No.: 12/101,177

(22) Filed: Apr. 11, 2008

(65) Prior Publication Data

US 2008/0258574 A1    Oct. 23, 2008

(30) Foreign Application Priority Data

Apr. 11, 2007  (JP)  ............................ P2007-104171
Apr. 10, 2008  (JP)  ............................ P2008-102331

(51) Int. Cl.
  *H01R 39/04*  (2006.01)
(52) U.S. Cl. ...................... 310/179; 310/177; 310/203; 310/200; 310/233; 310/225; 310/237
(58) Field of Classification Search .................. 310/173, 310/177, 200–207, 179, 234, 237; *H01R 39/04*
See application file for complete search history.

(56) References Cited

U.S. PATENT DOCUMENTS

| | | | | |
|---|---|---|---|---|
| 1,826,295 A * | 10/1931 | Apple | .......................... | 310/201 |
| 2,085,099 A * | 6/1937 | Jones | .......................... | 310/225 |
| 4,910,790 A * | 3/1990 | Kershaw | ....................... | 388/836 |
| 5,097,167 A * | 3/1992 | Kanayama et al. | .......... | 310/201 |
| 5,191,250 A * | 3/1993 | Kobayashi | ............ | 310/216.071 |
| 5,604,391 A * | 2/1997 | Edgerton | ..................... | 310/234 |
| 5,949,174 A * | 9/1999 | Moss et al. | .................. | 310/233 |
| 6,930,425 B2 * | 8/2005 | Kato | ........................... | 310/201 |
| 7,145,273 B2 * | 12/2006 | Even et al. | ..................... | 310/71 |
| 2002/0024266 A1 * | 2/2002 | Asao | ........................... | 310/201 |
| 2003/0160531 A1 * | 8/2003 | Kato | ........................... | 310/179 |
| 2003/0222528 A1 * | 12/2003 | Dobashi et al. | ............ | 310/179 |
| 2005/0073209 A1 * | 4/2005 | Koike | .......................... | 310/201 |

FOREIGN PATENT DOCUMENTS

JP             53-73403           6/1978

* cited by examiner

*Primary Examiner*—Karl I Tamai
*Assistant Examiner*—Terrance Kenerly
(74) *Attorney, Agent, or Firm*—Occhiuti Rohlicek & Tsao LLP

(57) ABSTRACT

A direct current motor including a rotor, a stator, a brush holder, and a brush. The rotor includes a core, a plurality of commutator segments, and a plurality of segment coils. The core has a plurality of teeth arranged along a circumferential direction of the rotor. A slot is formed between adjacent ones of the teeth in the circumferential direction. The plurality of commutator segments are arranged along the circumferential direction of the rotor inward from the plurality of teeth in the radial direction of the rotor. Each segment coil includes a plurality of segment conductors electrically connected to each other. The plurality of segment conductors in each segment coil extends through the slots along the axial direction of the rotor.

3 Claims, 9 Drawing Sheets

DC MOTOR WITH IMPROVED WIRING CONNECTIONS

BACKGROUND OF THE INVENTION

The present invention relates to a direct current motor.

Japanese Laid-Open Utility Model Publication No. 53-73403 discloses a direct current motor including a rotor provided with a core, a plurality of commutator segments, and a coil. The core has a plurality of teeth arranged along a circumferential direction, with each tooth extending along a radial direction of the rotor. The plurality of commutator segments are arranged inward from the plurality of teeth in the radial direction of the rotor along the circumferential direction of the rotor. Each of the commutator segments has a planar surface extending along the radial direction of the rotor (direction orthogonal to rotor axis). The coil is formed by continuously winding a conductive wire around the plurality of teeth. The motor further includes a stator and a brush. The stator has magnets facing the outer surface of the teeth in the radial direction of the rotor. The brush is held by a brush holder, which is fixed to the stator, and is pressed in an axial direction of the rotor to come in contact with the commutator segments. Such a motor enables more miniaturization in the axial direction than, for example, a motor in which commutator segments are arranged cylindrically at positions shifted from the coil in the axial direction and a brush is pressed from the outer side in the radial direction of the rotor to come in contact with the commutator segments.

However, the rotor described in Japanese Laid-Open Utility Model Publication No. 53-73403 is enlarged in the radial direction of the rotor since the teeth (coil) and the commutator segments are arranged next to one another in the radial direction of the rotor. In other words, the outer diameter of the rotor, and ultimately, the outer diameter of the motor, increases when enlarging the contact range (contact area) in the radial direction between the commutator segments and the brush. If the outer diameter of the motor is limited, the contact range (contact area) in the radial direction between the commutator segments and the brush would decrease such that a large amount of current cannot be supplied from the brush to the coil via the commutator segments. As a result, the generation of a high output with the motor becomes difficult.

SUMMARY OF THE INVENTION

It is an object of the present invention to provide a compact direct current motor having high output.

To achieve the above object, one aspect of the present invention is a direct current motor provided with a rotor, a stator, a brush holder, and a brush. The rotor includes a core, a plurality of commutator segments, and a plurality of segment coils. The core has a plurality of teeth arranged along a circumferential direction of the rotor. Each tooth extends along a radial direction of the rotor, and a slot is formed between adjacent ones of the teeth in the circumferential direction. The plurality of commutator segments are arranged along the circumferential direction inward from the plurality of teeth in the radial direction, with each commutator segment having a contact surface extending along the radial direction. The plurality of segment coils each includes a plurality of segment conductors electrically connected to each other. The plurality of segment conductors in each segment coil extends through the slots along an axial direction of the rotor. The stator includes a magnet facing toward outer surfaces of the teeth in the radial direction. The brush holder is fixed to the stator. The brush is held by the brush holder. The brush is pressed in the axial direction to come in contact with the contact surfaces of the commutator segments.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be discussed with reference to FIGS. 1 to 6.

Figure 1:
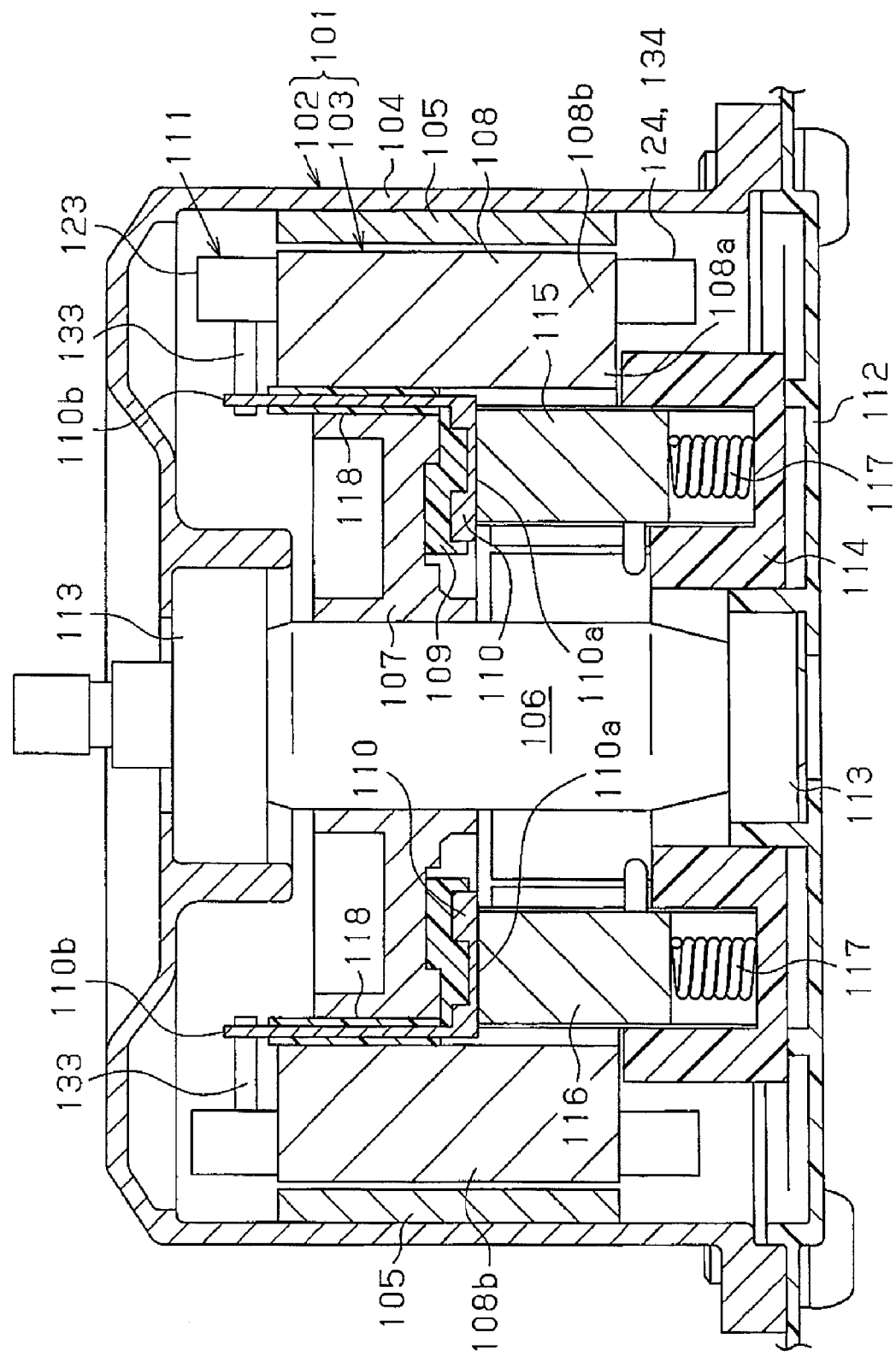
FIG. 1 is a cross-sectional view of a direct current motor according to the present embodiment.

As shown in FIG. 1, a direct current motor 101 includes a stator 102 and a rotor (armature) 103. The stator 102 includes a yoke housing 104, which is generally cylindrical and has a closed end, and ten magnets 105 (ten poles) fixed to an inner circumferential surface of the yoke housing 104 at equal angular intervals.

The rotor 103 includes a rotation shaft 106, a coupling member 107 fitted to the rotation shaft 106, a core 108 fixed to the outer side of the coupling member 107 in the radial direction of the rotor 103, a plurality of commutator segments 110 fixed to the surface at one end of the coupling member 107 (lower end surface in FIG. 1) in the axial direction of the rotor 103 by way of a first insulation member 109, and a plurality of segment coils 111 fixed to the core 108. The terms "radial direction", "axial direction", and "circumferential direction" respectively correspond to the axial direction, the radial direction, and the circumferential direction of the rotor 103 in the following description.

The two ends of the rotation shaft 106 of the rotor 103 are rotatably supported by bearings 113 held by the yoke housing 104 and an end housing 112, which closes the open end of the yoke housing 104. The core 108 faces the magnets 105 in the radial direction. The commutator segments 110 each have a planar contact surface 110a extending along the radial direction. A brush holder 114 for holding two brushes 115 and 116, which are arranged at an interval of 180° about the axis of the rotation shaft 106, is fixed to the end housing 112. The brushes 115 and 116 are pressed to contact the contact surfaces 11a of the commutator segments 110 in the axial direction by compression coil springs 117.

Figure 2:
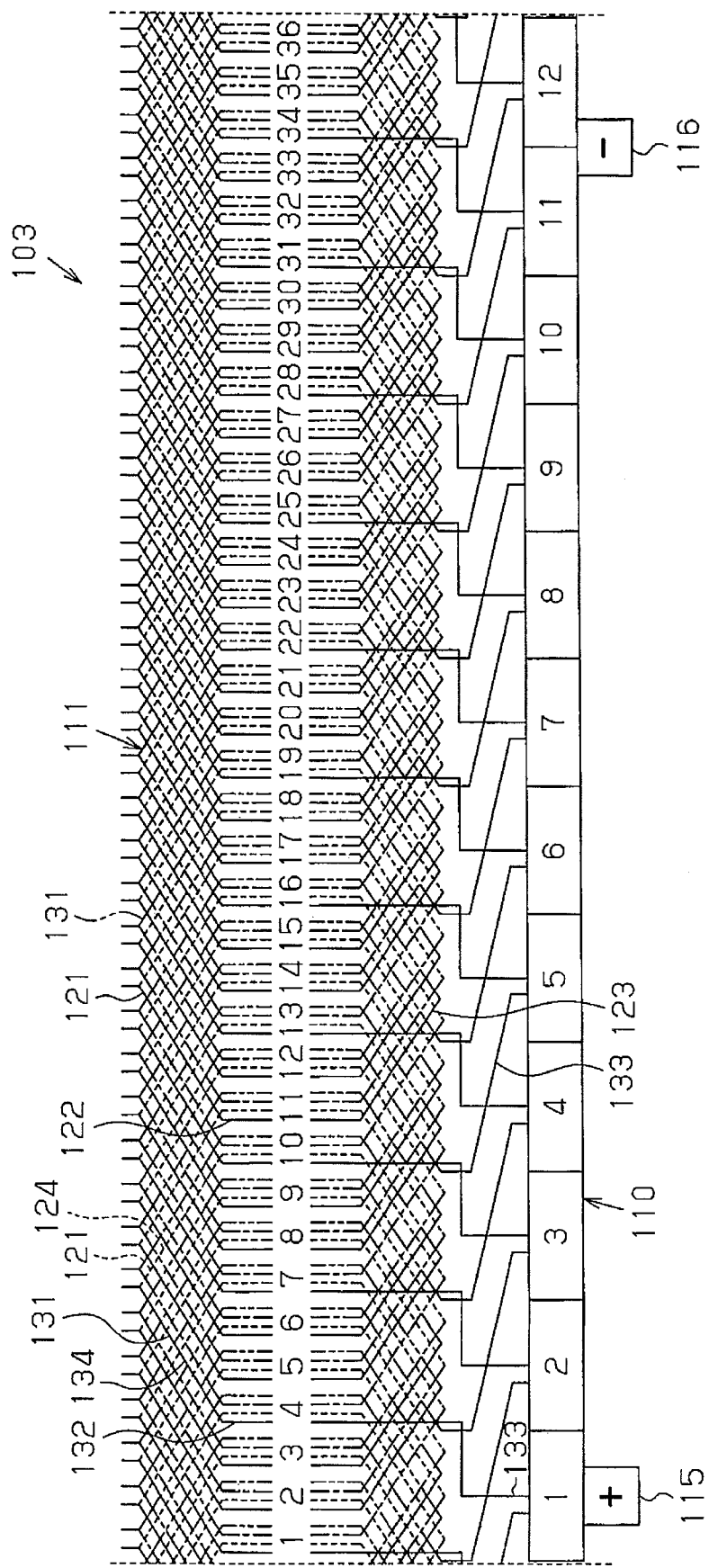
FIGS. 2 and 3 are schematic diagrams showing a rotor of FIG. 1 laid out along a plane in a divided manner.
Figure 3:
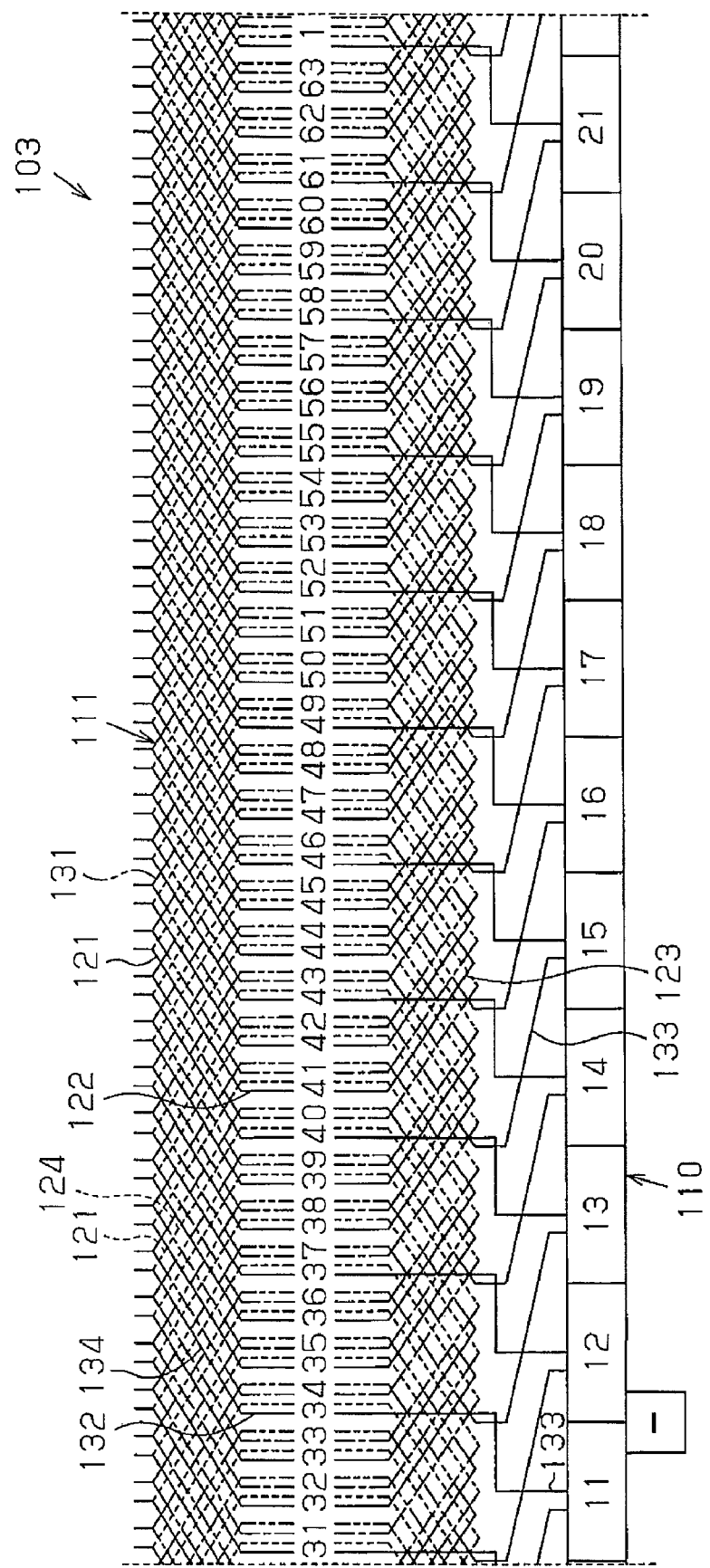

In detail, in the present embodiment, twenty-one commutator segments 110 are arranged along the circumferential direction. FIGS. 2 and 3 are schematic diagrams showing the rotor 103 laid out along a plane in a divided manner. In FIGS. 2 and 3, segment numbers "1" to "21" are sequentially added to the commutator segments 110, which are arranged successively in the circumferential direction.

A connection strip 110b, which axially extends away from the brushes 115 and 116, is formed at the radially outer end of each commutator segment 110. A plurality of through holes, which extend along the axial direction, are formed between the coupling member 107 and the core 108. The connection strips 110b project out of the upper end surface of the coupling member 107 in FIG. 1 through associated ones of the through holes. The connection strips 110b are covered by a second insulation member 118 between the coupling member 107 and the core 108 to insulate the coupling member 107 from the core 108.

Figure 5:
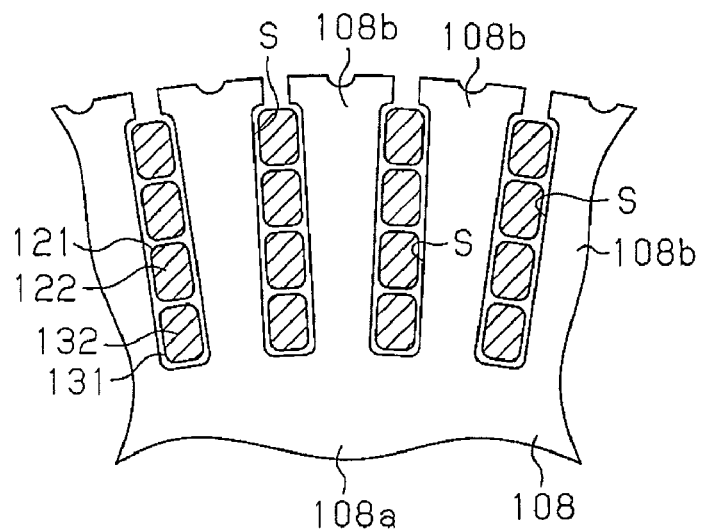
FIG. 5 is a partial plan view of a core shown in FIG. 1.
Figure 6A:
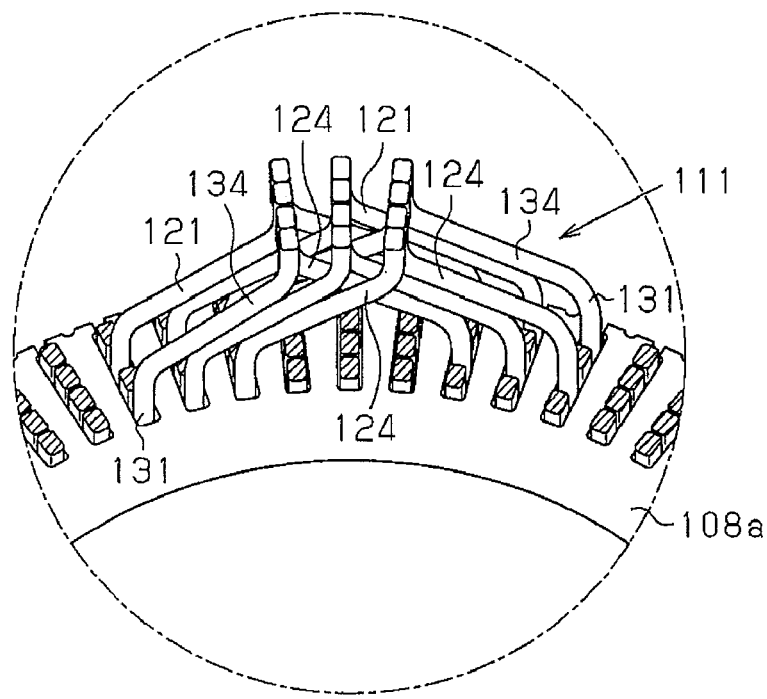
FIG. 6A is a partial perspective view showing the rotor of FIG. 1 taken from one side in an axial direction of the rotor.
Figure 6B:
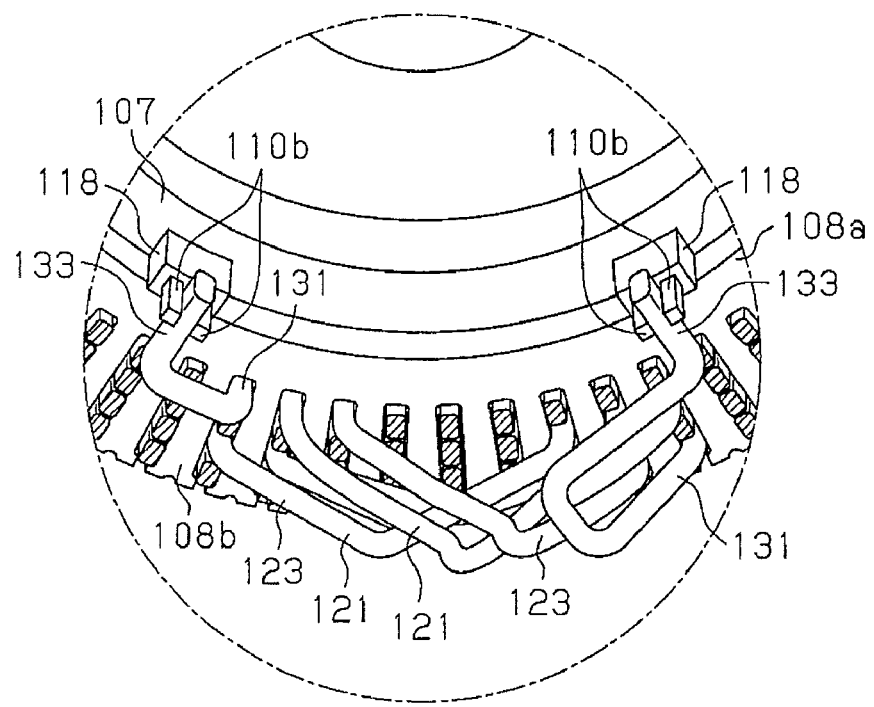
FIG. 6B is a partial perspective view of the rotor of FIG. 1 taken from the other side in the axial direction of the rotor.

As shown in FIG. 5, the core 108 includes a cylindrical portion 108a and a plurality of teeth 108b, which are arranged along the circumferential direction. Each of the plurality of teeth 108b extends radially outward from the cylindrical portion 108a. In the present embodiment, sixty-three teeth 108b are arranged in the core 108. A slot S is formed between adjacent ones of the teeth 108b in the circumferential direction. In FIGS. 2 and 3, slot numbers "1" to "63" are sequentially added to the slots S, which are sequentially arranged in the circumferential direction.

The axial width of the core 108 is greater than the axial width of the coupling member 107. The core 108 is fixed to the coupling member 107 so as to greatly project downward from the contact surfaces 11a of the commutator segments 110. In other words, the contact surfaces 110a are arranged within the width (intermediate position) of the core 108 in the axial direction.

Each segment coil 111 is formed by electrically connecting a plurality of first segment conductors 121 and a plurality of second segment conductors 131, which extend through the plurality of slots S in the axial direction. The slots S of the present embodiment are formed to be generally rectangular and elongated in the radial direction when viewed in the axial direction (refer to FIG. 5).

More specifically, a first segment conductor 121 is an overlapping winding and forms the main portion of a segment coil 111, as shown in FIGS. 2 to 4, and FIGS. 6A and 6B. A second segment conductor 131 forms portions other than the main portion of the segment coil 111, that is, the two ends of the segment coil 111.

The first segment conductor 121 is formed by bending a conductor plate, which has a generally square cross-section, into a generally U-shaped form. The first segment conductor 121 includes two slot insertion portions 122 corresponding to the parallel linear portions of the U-shape, a coupling portion 123 corresponding to the lower end of the U-shape and coupling the two slot insertion portions 122, and two segment connection portions 124 corresponding to the upper open ends of the U-shape. The two slot insertion portions 122 are formed so as to be arranged in two slots S that are spaced apart by a predetermined interval (e.g., by an interval corresponding to five or six slots S) in the circumferential direction. Each slot S has a first end and a second end in the axial direction. The first end is located at the upper side as viewed in FIG. 1 and located at the lower side as viewed in FIGS. 2 to 4 and 6. The second end is located at the lower side in FIG. 1, and is located at the upper side as viewed in FIGS. 2 to 4 and 6. The coupling portion 123 is located outside the first end of the slot S and couple the ends of two slot insertion portions 122. The two segment connection portions 124 are located outside the second end of a slot S and extend toward each other from the ends of two slot insertion portions 122 but are not coupled with each other.

The second conductor 131 is formed by bending a conductor plate having a substantially square cross-section. The second segment conductor 131 includes a single slot insertion portion 132, a commutator connection portion 133, and a segment connection portion 134. The slot insertion portion 132 is arranged in the slot S. The commutator connection portion 133 is located outside the first end of a slot S and extends from an end of the slot insertion portion 132 to the exposed distal end of the connection strip 110b of a corresponding commutator segment 110. The segment connection portion 134 is located outside the second end of a slot S and extends from an end of the slot insertion portion 132 to the segment connection portion 124 of the first segment conductor 121.

Figure 4:
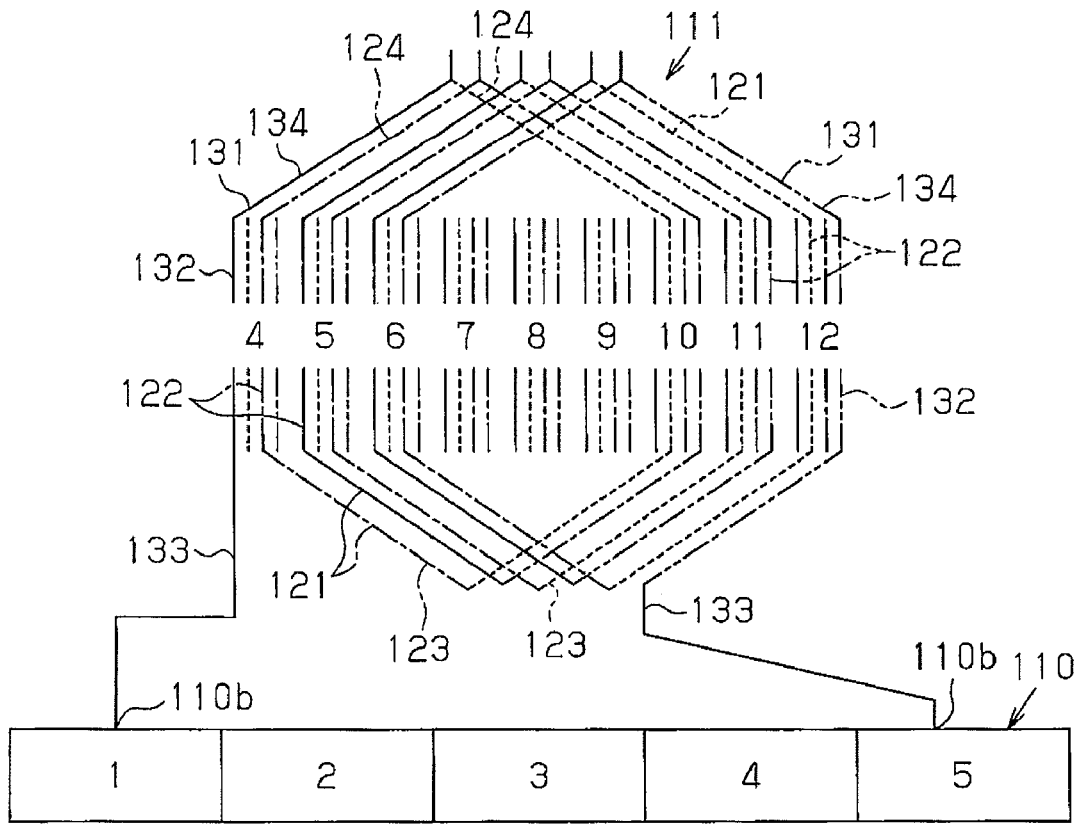
FIG. 4 is a partial schematic diagram showing part of FIG. 2.

The commutator connection portion 133 is electrically connected (welded) to the connection strip 110b, and the segment connection portions 124 and 134 are electrically connected (welded) to each other. For example, as shown in FIG. 4, the segment coil 111 is wound to the slots S in the order of slot numbers "4", "10", "4", "10", "5", "11", "5", "11", "6", "12", "6", "12" from the connection strip 110b of the commutator segment 110 of segment number 1 and formed continuously to the connection strip 110b of the commutator segment 110 of segment number "5". The wiring from segment number "1" to segment number "5" is formed by electrically connecting (welding) one second conductor 131, five first segment conductors 121, and one second segment conductor 131 in this order. To facilitate understanding of such wiring, some of the wiring and connection strips 110b are not shown in FIGS. 4 and 6. The segment coil from segment number "2" to segment number "6", the segment coil from segment number "3" to segment number "7", and the like having a pattern similar to the segment coil 111 shown in FIGS. 4 and 6 are arranged at equal intervals along the circumferential direction (refer to FIGS. 2 and 3). The slot insertion portions 122 and 132 are arranged next to each other in the radial direction in one slot S (refer to FIGS. 5 and 6). In FIGS. 2 to 4, the slot insertion portions 122 and 132 arranged at the innermost side in the radial direction in the slot S are shown by solid lines, the slot insertion portions 122 arranged to be second from the innermost side in the radial direction are shown by broken lines, the slot insertion portions 122 arranged to be third from the innermost side in the radial direction are shown by a single-dot lines, and the slot insertion portions 122 and 132 arranged at the outermost side in the radial direction are shown by double-dot lines.

The brushes 115 and 116 of the present embodiment are entirely arranged within the width of the segment coils 111 in the axial direction. That is, the brushes 115 and 116 are arranged so that they do not project outward from the coil end or the end of the segment coil 111 in the axial direction.

The embodiment has the characteristic advantages described below.

(1) The motor 101 of the present embodiment includes the segment coils 111 formed by electrically connecting the plurality of first and second segment conductors 121 and 131. This easily increases the coil space factor of the motor 101 compared to motors using coils (normal coils) formed by continuously winding a conductive wire to the teeth. In particular, the slots S of the present embodiment are generally rectangular and elongated in the radial direction when viewed in the axial direction (refer to FIG. 5). Further, the slot insertion portions 122 and 132 have a generally square cross-section and are arranged in the slots S next to each other in the radial direction. This minimizes the gaps in the slots S, increases the efficiency of the motor 101, and raises the coil space factor. As a result, when the performance is the same as a motor using normal coils, the radial length of the teeth 108*b* may be shortened in the motor 101 of the present embodiment. Further, if the motor 101 has an outer diameter that is the same as a motor using normal coils, the contact range (contact area) in the radial direction between the commutator segment 110 and the brushes 115 and 116 is larger than the motor that uses normal coils. By this, a large amount of current is easily supplied from the brushes 115 and 116 to the segment coils 111 through the commutator segments 110. As a result, compared to a motor using normal coils, the motor 101 generates a higher output without being enlarged. In other words, the motor 101 can be miniaturized while maintaining the same performance (output) as a motor using normal coils.

The slot insertion portions 122 and 132 of the first and second segment conductors 121 and 131 in the present embodiment are arranged next to one another along the radial direction (and not next to one another along the circumferential direction) in the slots S. Thus, the coupling portion 123, the segment connection portions 124 and 134, and the commutator connection portion 133 located outside a slot S are independently exposed in the circumferential direction (i.e., without coming into contact with other coupling portions and connection portions in the circumferential direction). In a motor using normal coils, a conductive wire is continuously wound around the teeth. Thus, part of the conductive wire located outside the slot is covered by the adjacent conductive wire in the circumferential direction. Therefore, all of the segment coils 111 (the first and second segment conductors 121 and 131) in the present embodiment are more easily cooled, particularly during rotation of the rotor 103 as compared to a normal coil. This prevents the coil resistance of the segment coils 111 from increasing and stabilizes the characteristics of the direct current motor 101.

(2) The contact surfaces 110*a* of the commutator segments 110 are arranged within the width (intermediate position in the axial direction) of the core 108 (teeth 110*b*) in the axial direction. Thus, at least part of the brushes 115 and 116 that are pressed to contact the contact surfaces 110*a* is also arranged within the axial width of the core 108 (teeth 108*b*). Thus, the direct current motor 101 can be miniaturized in the axial direction.

(3) The brushes 115 and 116 are entirely arranged within the axial width of the segment coil 111. More specifically, the brushes 115 and 116 are entirely arranged so as not to project out in the axial direction from the second coil end corresponding to the lower ends of the segment coils 111 in FIG. 1. Thus, the direct current motor 101 can be miniaturized in the axial direction.

(4) The connection portions (commutator connection portions 133 and connection strips 110*b*) of the second segment conductors 131 and the commutator segments 110 are arranged on the side of the core 108 that is axially opposite to the side on which the connection portions (segment connection portions 124 and 134) of the first and second segment conductors 121 and 131 are arranged. This prevents all of the connection portions from being concentrated and densified at one axial end of the core 108. Thus, for example, a wide work space for connecting (welding) the connection portions can be obtained. This facilitates the connecting (welding).

The above embodiment may be modified as described below.

The direct current motor 101 includes ten magnets 105 (ten poles), sixty-three slots S (slot numbers "1" to "63"), and twenty-one commutator segments 110 (segment number "1" to "21") in the above embodiment. However, the number of the magnets 105, slots S, and commutator segments 110 is not limited as above.

Commutator segments that are spaced apart in the circumferential direction may be electrically connected by a short-circuit member.

The segment coils may be wired in other patterns as long as a plurality of segment conductors, which extend through the slots S in the axial direction, are electrically connected.

Figure 7:
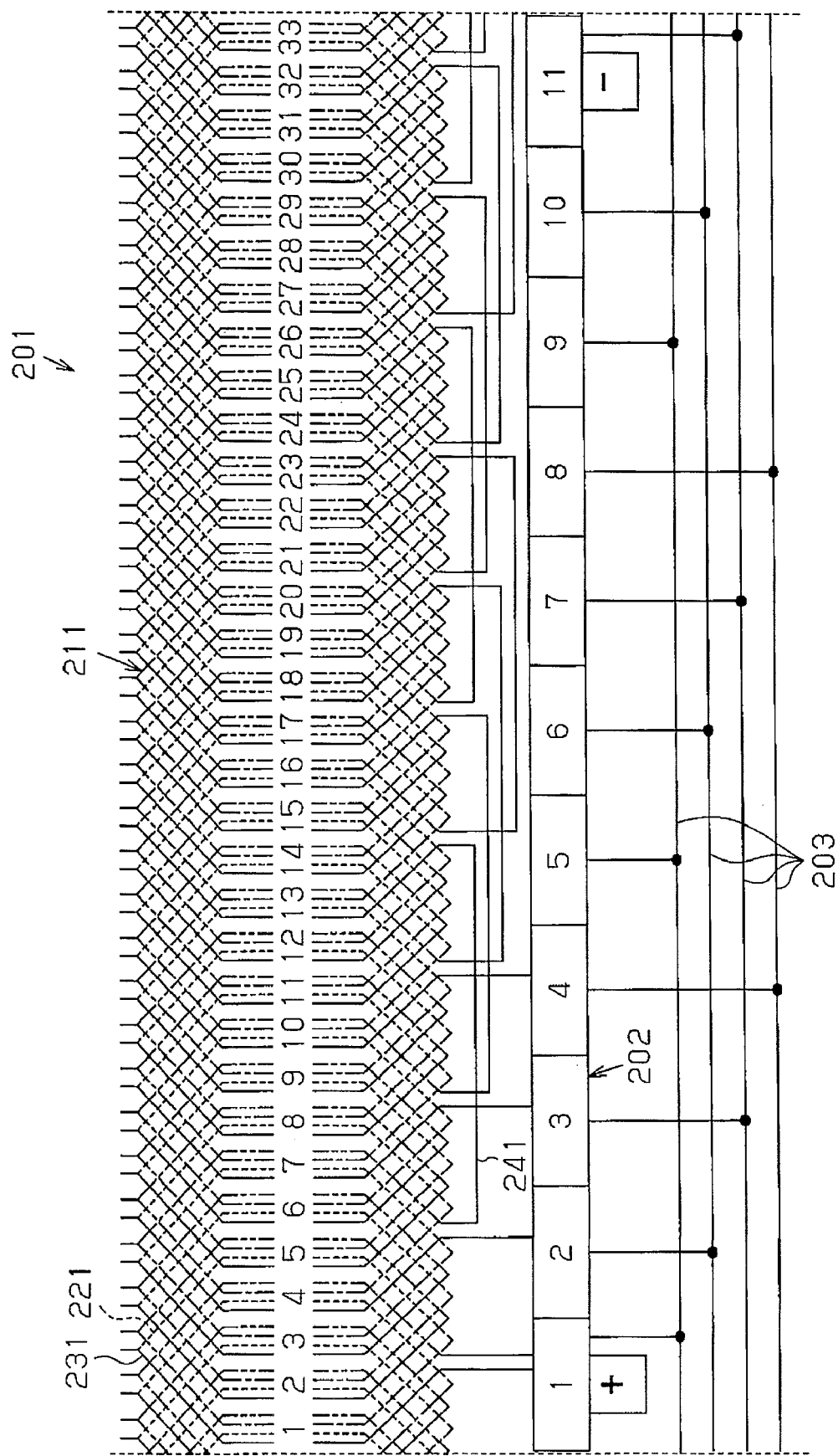
FIGS. 7 and 8 are schematic diagrams showing a rotor according to another example of the present invention laid out along a plane in a divided manner.
Figure 8:
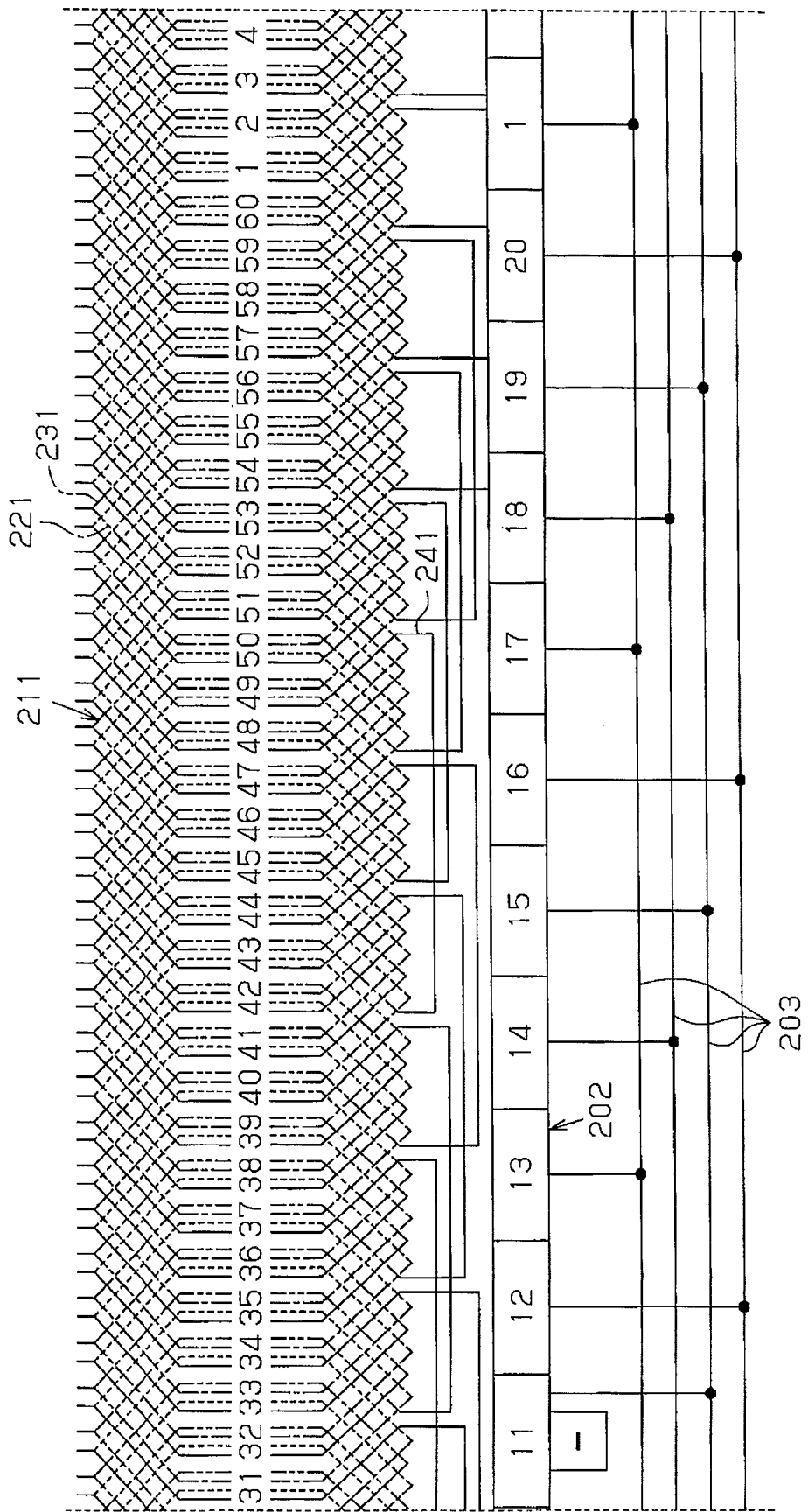
Figure 9:
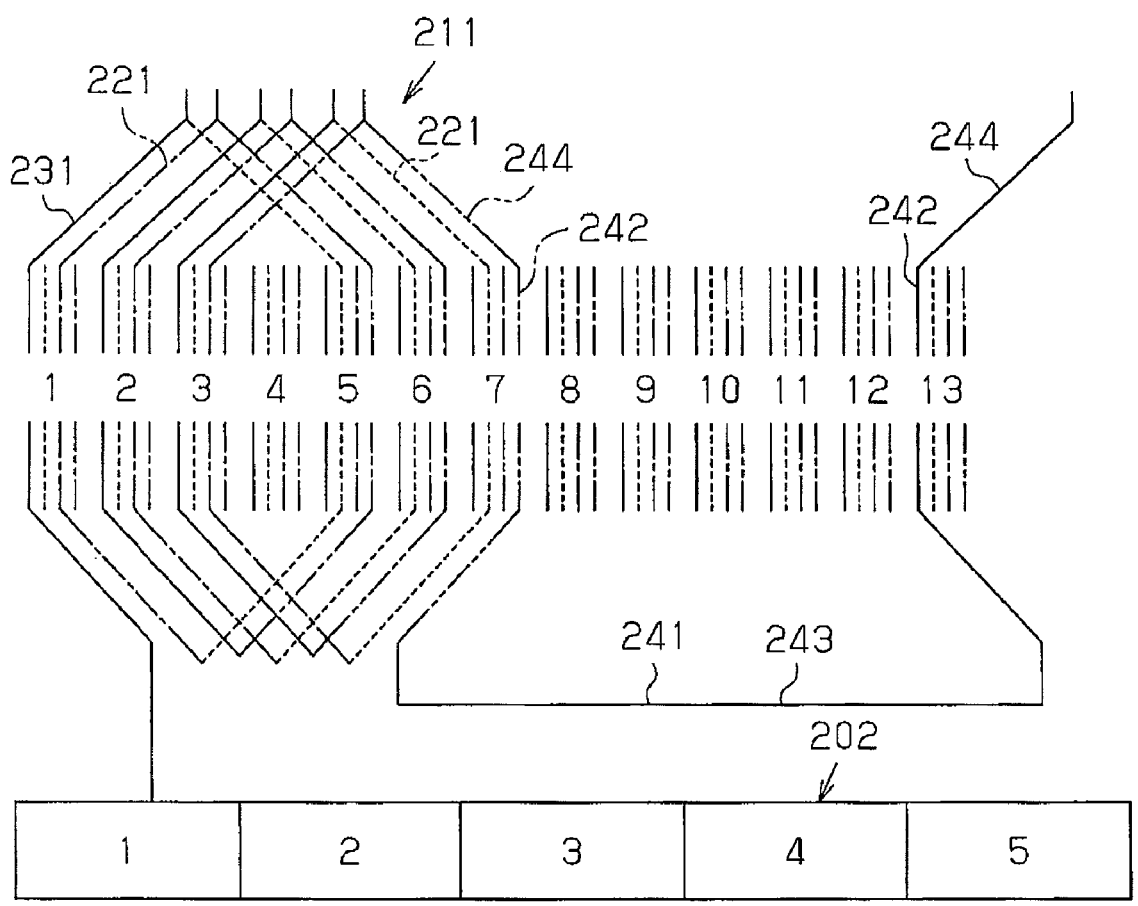
FIG. 9 is a partial schematic diagram showing part of FIG. 7.

For example, the pattern of the segment coil 111 may be changed to the pattern of a segment coil 211 shown in FIGS. 7 to 9. The direct current motor of this example includes ten magnets (not shown), sixty slots (slot numbers "1" to "60"), and twenty commutator segments 202 (segment numbers "1" to "20").

In this example, the commutator segments 202 (segment numbers "1" to "20") are electrically connected by a short-circuit wire 203, which serves as a short-circuit member, at an interval corresponding to three commutator segments 202 along the circumferential direction, that is, at an interval of (360/20×4=) 72°.

The segment coil 211 of this example is formed by electrically connecting a plurality of first, second, and third segment conductors 221, 231, and 241, which extend through the slots S (slot numbers "1" to "60" in FIGS. 7 and 8) in the axial direction.

More specifically, a first segment conductor 221 is an overlapping winding and forms the main portion of a segment coil 211. A second segment conductor 231 forms portions other than the main portion of the segment coil 211, that is, the two ends of the coil. A third segment conductor 241, which forms portions other than the main portion of the segment coil 211, is a coupling portion that couples the main portions. The first segment conductor 221 and the second segment conductor 231 of this example are formed generally in the same manner as the first segment conductor 121 and the second segment conductor 131 of the above embodiment.

The third segment conductor 241 is formed by bending a conductor plate having a generally square cross-section. The third segment conductor 241 includes two slot insertion portions 242, a coupling portion 243, and two segment connection portions 244. The two slot insertion portions 242 are arranged in two slots S that are spaced apart by an interval corresponding to five slots S along the circumferential direction. The coupling portion 243 is located outside the first end of the slot S (side opposite to the segment connection portion 244 in the axial direction) and is formed to couple the ends of the two slot insertion portions 242. The two segment connection portions 244 are located outside the second end of the slot S (side opposite to the coupling portion 243 in the axial direction) and is formed to extend away from the ends of the two slot insertion portions 242.

As shown in FIG. 9, the segment coil 211, for example, includes a wiring wound to the slots in the order of slot number "1", "5", "5" "2", "6", "2", "±6", "3", "7", "3", "7" from the commutator segment 202 of segment number "1" and then shifted to the slot of slot number "13", which is spaced apart by an interval corresponding to five slots S from the slot of slot number "7". The segment coil 211 is formed by continuously repeating the above-described wiring pattern to the slot S corresponding to the commutator segment 202 of segment number "18". The wiring from segment number "1"

to segment number "18" is formed by electrically connecting (welding) one second segment conductor 231, five first segment conductors 221, one third segment conductor 241, five first segment conductors 221, one third segment conductor 241, five first segment conductors 221, one third segment conductor 241, five first segment conductors 221, one third segment conductor 241, five first segment conductors 221, one third segment conductor 241, five first segment conductors 221, and one second segment conductor 231 in this order. The rotor 201 further includes three wirings having the same pattern as the segment coil from segment number "1" to segment number "18", that is, the segment coil from segment number "2" to segment number "19", the segment coil from segment number "3" to segment number "20", and the segment coil from segment number "4" to segment number "1".

The direct current motor including the segment coil 211 as described has the same advantages as the above embodiment.

In the above embodiment, the contact surface 110a of the commutator segment 110 is arranged within the width (intermediate position in the axial direction) of the core 108 (teeth 108b) in the axial direction but may be arranged, for example, to be flush with at least one of the end surfaces of the core 108 (teeth 108b) in the axial direction.

In the above embodiment, the brushes 115 and 116 are entirely arranged within the width of the segment coil 111 in the axial direction. However, part of the brushes 115 and 116 may project out of the coil end in the axial direction.

In the above embodiment, the connection portions (commutator connection portions 133 and connection strips 110b) of the second segment conductors 131 and the commutator segments 110 are arranged on the side of the core 108 that is axially opposite to the side on which the connection portions (segment connection portions 124 and 134) of the first and second segment conductors 121 and 131 are arranged, but may be also be arranged on the same side of the core 108.

Figure 10:
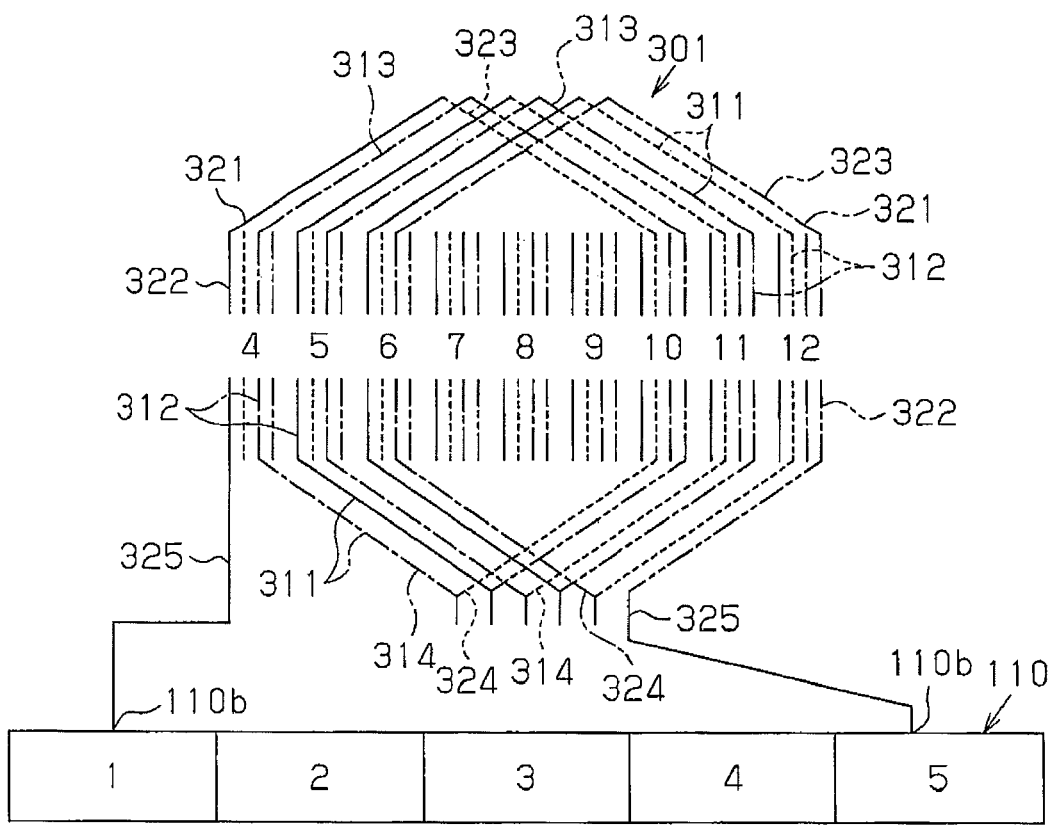
FIG. 10 is a partial schematic diagram in which part of a rotor according to a further example of the present invention is laid out along a plane, and one part is extracted.
Figure 11:
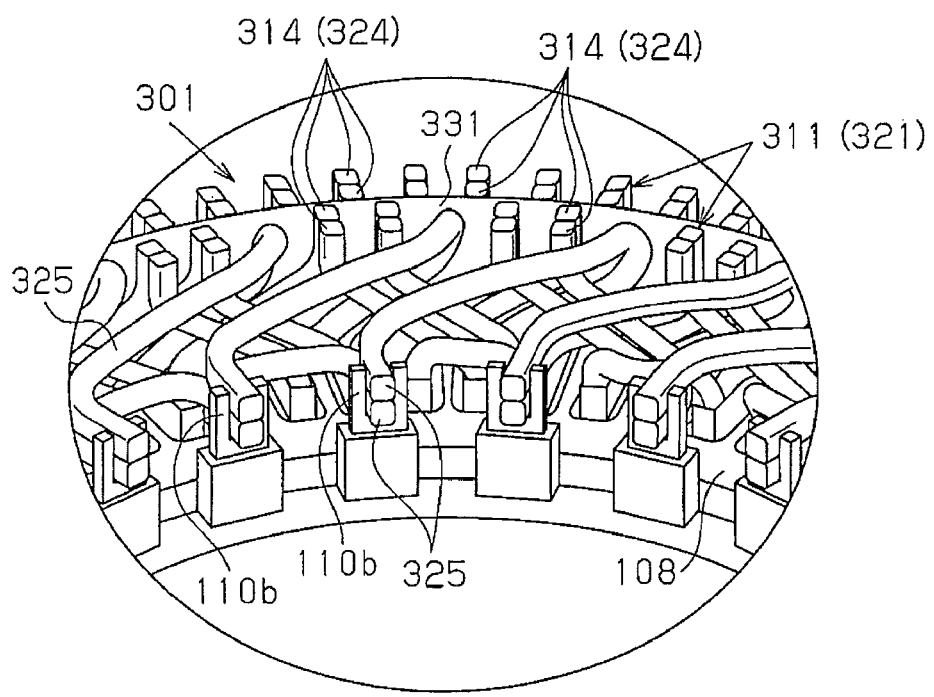
FIG. 11 is a partial perspective view of the rotor of FIG. 10 taken from one side in the axial direction of the rotor.

More specifically, for example, the segment coil 111 of the above described embodiment may be modified to a segment coil 301 shown in FIGS. 10 and 11. That is, the segment coil 301 of this example is formed by electrically connecting a plurality of first and second segment conductors 311 and 321 (refer to FIG. 10) extending through the slots S (refer to FIGS. 2 and 3, slot numbers "1" to "63") between the teeth 108b in the axial direction. FIG. 10 corresponds to FIG. 4 of the above embodiment and is a schematic diagram laying out part of the rotor along a plane.

In detail, the first segment conductor 121 is an overlapping winding and forms the main portion of the segment coil 301. The second segment conductor 321 forms the main portion of the segment coil 301 and the two coil ends.

The first segment conductor 311 is substantially the same as the first segment conductor 121 of the above embodiment. The first segment conductor 311 is formed by bending a conductor plate having a substantially square cross-section into a generally U-shaped form. The first segment conductor 311 includes two slot insertion portions 312 corresponding to the parallel linear portions of the U-shape, a coupling portion 313 corresponding to the lower end of the U-shape for coupling the two slot insertion portions 312, and two segment connection portions 314 corresponding to the upper open ends of the U-shape. The two slot insertion portions 312 are formed to be arranged in two slots S that are spaced apart in the circumferential direction (by an interval corresponding to six slots S). The coupling portion 313 is located outside the second end of a slot S (upper side in FIG. 10, and the side that is not shown in FIG. 11) and is formed to couple the ends of the two slot insertion portions 312. The two segment connection portions 314 are located outside the first end of a slot S (lower side in FIG. 10, and the side shown in FIG. 11) and are formed to extend toward each other from the ends of the two slot insertion portions 312 but shifted in the radial direction so that they do not couple with each other.

The second segment conductor 321 differs from the second segment conductor 131 of the above embodiment. The second segment conductor 321 is formed by bending a conductor plate having a generally square cross-section into a generally U-shaped form. The second segment conductor 321 includes two slot insertion portions 322 corresponding to the parallel linear portion of the U-shape, a coupling portion 323 corresponding to the lower end of the U-shape for coupling the two slot insertion portions 122, and a segment connection portion 324 and a commutator connection portion 325 corresponding to the upper open ends of the U-shape. The two slot insertion portions 322 is formed so as to be arranged in two slots S that are spaced apart from each other in the circumferential direction (by an interval corresponding to five or six slots S). The coupling portion 323 is located outside the second end of the slot S (upper side in FIG. 10, and the side not shown in FIG. 11) and is formed to couple the ends of the two slot insertion portions 322. The segment connection portion 324 is located outside the first end of the slot S (lower side in FIG. 10, and the side shown in FIG. 11) and is formed to extend from the end of the slot insertion portion 322 to the segment connection portion 314 in the overlapping winding segment conductor 311. The commutator connection portion 325 is located outside the first end of the slot S (lower side in FIG. 10, and side shown in FIG. 11) and is formed to extend from the end of the slot insertion portion 322 to the exposed distal end of the connection strip 110b of the commutator segment 110.

The number of first and second segment conductors 311 and 321 is obtained from n×m/2, where n represents the number of slot insertion portions 312 and 322 arranged in one slot S (four along the radial direction in this example), and m represents the number of slots S (sixty-three in this example). In this example, the total number of the first and second segment conductors 311 and 321 is one-hundred-twenty-six, where eighty-four are first segment conductors 311 and forty-two are second segment conductors 321.

The commutator connection portion 325 and the connection strip 110b of the commutator segment 110 are located outside the first end of the core 108 (lower side in FIG. 10, the side shown in FIG. 11) and are electrically connected (welded) to each other to obtain a circuit configuration similar to the above embodiment. The segment connection portions 314 and 324 are electrically connected (welded) outside the first end of the core 108. In this example, as shown in FIG. 11, an insulator (insulation paper) 331 is used to insulate two of the segment connection portions 314 and 324 (connection portions) exposed to the outside of the first end of the core 108 in the radial direction.

Such a structure also obtains advantages (1) to (3) of the above embodiment. The connection portions (commutator connection portion 325 and connection strip 110b) of the second segment conductor 321 and the commutator segment 110 are arranged on the same axial side of the core 108 as the connection portions (segment connection portion 314 and 324) of the first and second segment conductors 311 and 321. Thus, the connecting (welding) of all the connection portions can be performed on the same side in a concentrated manner. In other words, the connecting (welding) does not need to be performed on two axial sides of the core 108 as in the above embodiment. This facilitates the connecting (welding).

The first and second segment conductors 311 and 321 include the two slot insertion portions 312 and 322, the coupling portion 313 and 323, and the segment connection portions 314 and 324 or the commutator connection portion 325.

The total number of the first and second segment conductors 311 and 321 is n×m/2, where n represents the number of slot insertion portions 312 and 322 arranged in one slot S, and m represents the number of slots S. Thus, the total number of segment conductors 311 and 321 is the least among the examples described in the present specification while facilitating the positioning of the first and second segment conductors 311 and 321 by inserting them into the slot S from the same side in the axial direction of the core 108. This is realized by arranging the connection portions (commutator connection portion 325 and the connection strip 110b) of the segment conductor 321 and the commutator segment 110 and the connection portions (segment connection portion 314, 324) between the first and second segment conductors 311 and 321 outside the first end (same side in the axial direction) of the core 108. In other words, in the structure of the above embodiment, the second segment conductor 131, which has one slot insertion portion (connecting the first segment conductor 121 and the commutator segment 110) at the end of the segment coil, is necessary. Thus, the total number of the first and second segment conductors 121 and 131 is increased by the second segment conductor 131. However, in the structure of this example (refer to FIGS. 10 and 11), the first and second segment conductors 311 and 321 all include two slot insertion portions 312 and 322. This minimizes the total number of segment conductors. Specifically, the total number of first and second segment conductors 121 and 131 is one-hundred-forty-seven (one-hundred-five first segment conductors 121, and forty-two end segment conductors 131) in the above embodiment. However, the total number of first and second segment conductors 311 and 321 is one-hundred-twenty-six (eighty-four first segment conductors 311 and forty-two second segment conductors 321) in this example. With such a structure, the connecting (welding) of all the connection portions can be performed on the same axial side of the core 108 in a concentrated manner. That is, the connecting (welding) of the connection portions does not need to be performed on two axial sides of the core 108 as in the above embodiment.

What is claimed is:

1. A direct current motor comprising:
 a rotor including:
  a core having a plurality of teeth arranged along a circumferential direction of the rotor, with each tooth extending along a radial direction of the rotor, and a slot being formed between adjacent ones of the teeth in the circumferential direction;
  a plurality of commutator segments arranged along the circumferential direction inward from the plurality of teeth in the radial direction, with each commutator segment having a contact surface extending along the radial direction; and
  a plurality of segment coils, with each segment coil including a plurality of segment conductors electrically connected to each other so that each segment coil forms a connection portion, the plurality of segment conductors in each segment coil extending through the slots along an axial direction of the rotor, all of the connection portions of the segment conductors of the plurality of segment coils being arranged on the same side of the core in the axial direction;
 a stator including a magnet facing toward outer surfaces of the teeth in the radial direction;
 a brush holder fixed to the stator; and
 a brush held by the brush holder, the brush being pressed in the axial direction to come in contact with the contact surfaces of the commutator segments,
 wherein the segment conductors include a segment conductor connected to the commutator segments, with a connection portion of the segment conductor and the commutator segments being arranged on the core at a side opposite in the axial direction to a side on which connection portions of the plurality of segment conductors are arranged.

2. The direct current motor according to claim 1, wherein the contact surface is arranged within a width of the tooth in the axial direction.

3. The direct current motor according to claim 1, wherein the brush is entirely arranged within a width of the segment coil in the axial direction.

* * * * *